(12) United States Patent
Collins

(10) Patent No.: US 8,070,094 B2
(45) Date of Patent: Dec. 6, 2011

(54) AIRCRAFT LANDING GEAR ACTUATOR

(75) Inventor: Andrew John Collins, WestonSuperMare (GB)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 704 days.

(21) Appl. No.: 12/174,038

(22) Filed: Jul. 16, 2008

(65) Prior Publication Data

US 2010/0012779 A1    Jan. 21, 2010

(51) Int. Cl.
*B64C 25/12* (2006.01)
(52) U.S. Cl. ............... 244/102 A; 244/102 SL
(58) Field of Classification Search ............ 244/102 R, 244/102 A, 102 SL, 102 SS
See application file for complete search history.

(56) References Cited

U.S. PATENT DOCUMENTS

| | | | |
|---|---|---|---|
| 3,904,153 A | 9/1975 | Watts | |
| 4,637,272 A | 1/1987 | Teske et al. | |
| 5,092,539 A | 3/1992 | Caero | |
| 5,128,688 A | 7/1992 | West | |
| 6,446,519 B1 | 9/2002 | Biester | |
| 6,453,761 B1 | 9/2002 | Babinski | |
| 6,791,215 B2 | 9/2004 | Tesar | |
| 6,811,118 B2* | 11/2004 | Collet et al. | 244/102 SL |
| 6,820,715 B2 | 11/2004 | Laurent et al. | |
| 7,098,619 B2 | 8/2006 | Stridsberg | |
| 7,190,096 B2 | 3/2007 | Blanding et al. | |
| 2005/0269887 A1 | 12/2005 | Blanding et al. | |
| 2006/0113933 A1 | 6/2006 | Blanding et al. | |
| 2006/0266146 A1 | 11/2006 | Waide | |

FOREIGN PATENT DOCUMENTS

| WO | 2007/024220 | 3/2007 |
|---|---|---|
| WO | 2007 099333 | 9/2007 |

OTHER PUBLICATIONS

International Search Report for PCT Application No. PCT/US2009/050796, Mar. 10, 2010.

* cited by examiner

*Primary Examiner* — Rob Swiatek
(74) *Attorney, Agent, or Firm* — Carlson, Gaskey & Olds PC

(57) ABSTRACT

A landing gear system that includes a landing gear strut rotatable between stowed and deployed positions. An actuator is connected to the landing gear strut, and includes main and emergency drives housed within a common body and operable independently from one another. A controller in communication with the actuator is configured to command the actuator between the stowed and deployed positions in response to an input. The controller commands the main drive during a normal operating condition and commands the emergency drive in a failure condition of the main drive. The actuator includes a body supporting emergency and main leadscrews arranged coaxially with one another. Main and emergency motors respectively are coupled to the main and emergency leadscrews. An output rod is supported by and extends from the body. The output rod is threadingly coupled to and is coaxial with the main leadscrew and configured to move axially in response to rotation of the main leadscrew. A brake selectively enables and disables the emergency drive.

10 Claims, 11 Drawing Sheets

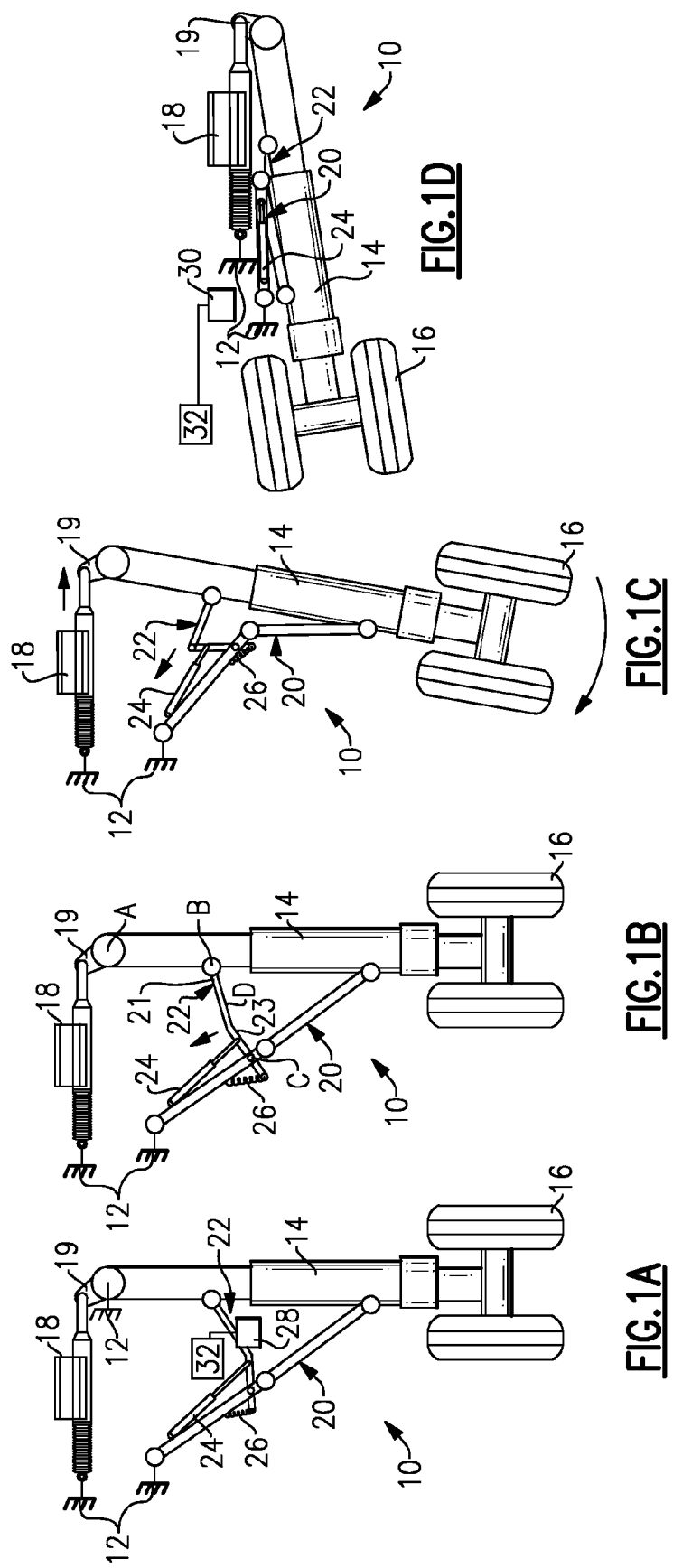

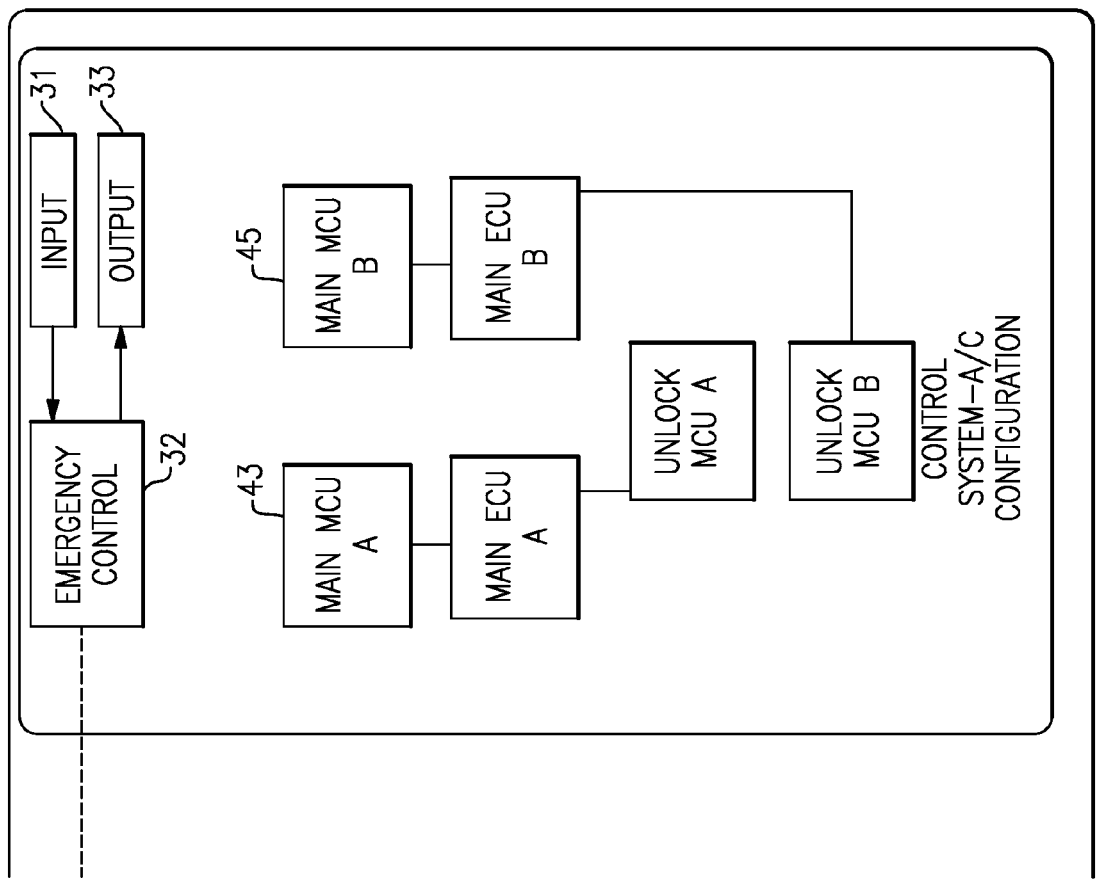

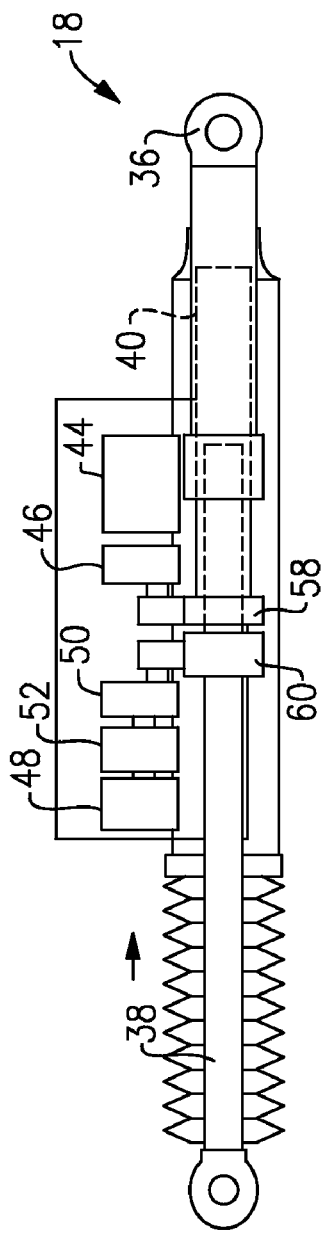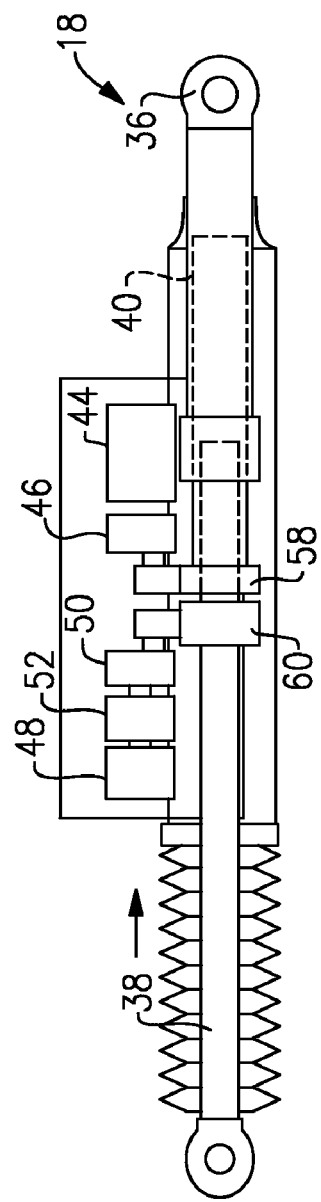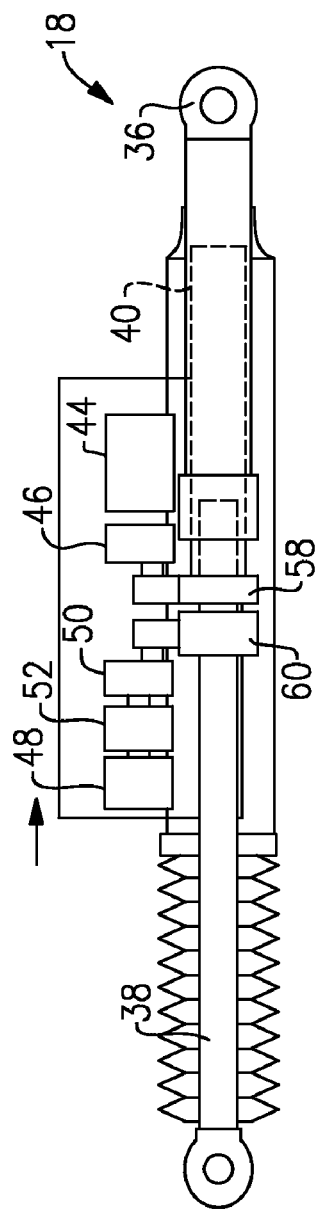

AIRCRAFT LANDING GEAR ACTUATOR

BACKGROUND

This disclosure relates to an aircraft landing gear actuator. More particularly, this disclosure relates to an actuator that when mechanically jammed will not prevent the landing gear from fully deploying.

Aircraft employ landing gear arrangements that must be reliably deployed from a stowed position during landing. In one type of arrangement, the landing gear is rotated about a pivot by an extend/retract actuator. A lock-stay is biased over-center to lock the landing gear in a deployed position. To retract the landing gear, an unlock actuator pulls the lock-stay from over-center, which enables the extend/retract actuator to retract the landing gear to the stowed position. Both the extend/retract and unlock actuators are typically hydraulically powered. It is desirable to use electromechanical actuators to benefit from the increasing use of electrically powered aircraft systems.

Landing gear actuators must reliably deploy in the event of a mechanical jam within the actuator. If electromechanical actuators are employed, they also must deploy in the event of a main power failure. What is needed is a jam tolerant extend/retract actuator that enables the landing gear to be fully deployed regardless of a mechanical jam or loss of main power.

SUMMARY

This disclosure relates to a landing gear system that includes a landing gear strut rotatable between stowed and deployed positions. An actuator is connected to the landing gear strut, and includes main and emergency drives housed within a common body and operable independently from one another. A controller in communication with the actuator is configured to command the actuator between the stowed and deployed positions in response to an input. The controller commands the main drive during a normal operating condition and commands the emergency drive in a failure condition of the main drive.

The actuator includes a body supporting emergency and main leadscrews arranged coaxially with one another, for example. Main and emergency motors respectively are coupled to the main and emergency leadscrews in one example. An output rod is supported by and extends from the body. The output rod is threadingly coupled to and is coaxial with the main leadscrew and configured to move axially in response to rotation of the main leadscrew. A brake selectively enables and disables the emergency drive in one example embodiment.

These and other features of the application can be best understood from the following specification and drawings, the following of which is a brief description.

BRIEF DESCRIPTION OF THE DRAWINGS

FIGS. 1A-1D schematically illustrate the landing gear in deployed and locked, deployed and unlocked, retracting and stowed positions, respectively.

FIGS. 2, 2A and 2B are schematic views of a control system for the extend/retract and unlock actuators.

FIGS. 8-13 schematically illustrate the extend/retract actuator throughout the retract and deploy cycles with a mechanical jam.

DETAILED DESCRIPTION

Figure 2A:
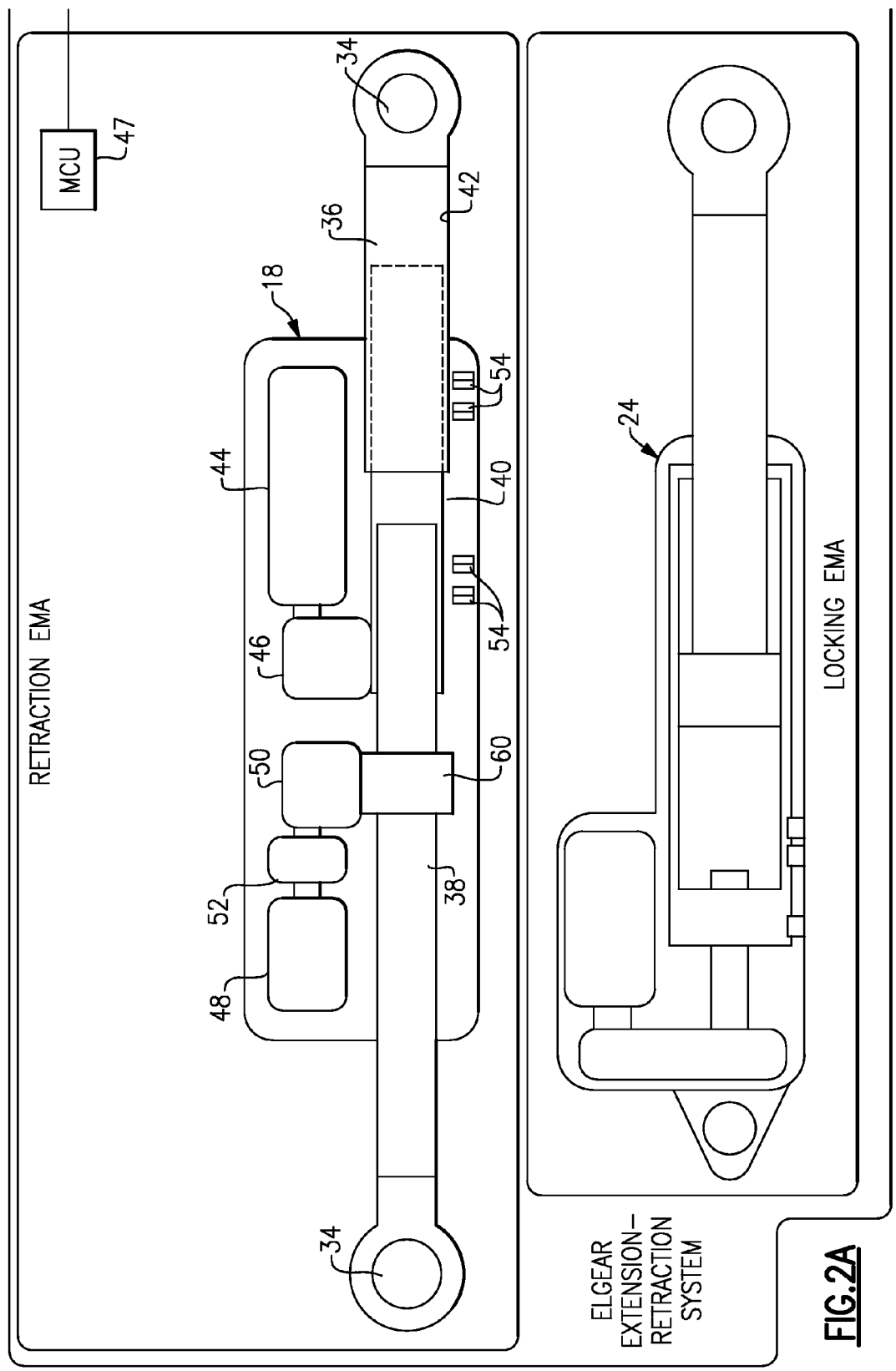

A retracting cycle of a landing gear 10 is illustrated in FIGS. 1a-1d. FIG. 1a depicts the landing gear 10 in a fully deployed and locked position. FIG. 1b depicts the landing gear 10 in a fully deployed and unlocked position. FIG. 1c depicts the landing gear 10 while it is being retracted. FIG. 1d depicts the landing gear 10 in a stowed position.

The landing gear 10 includes a strut 14 supporting wheels 16. The strut 14 is rotatable about a pivot, which is provided by an airframe 12, in response to an extend/retract actuator applying a force to an arm 19. A linkage 20 connects a lower portion of the strut 14 to the airframe 12, for example. A lock-stay 22 is interconnected between the linkage 20 and the strut 14 to lock the landing gear 10 in the fully deployed position until the pilot retracts the landing gear.

In FIG. 1a, the landing gear 10 is shown locked in the fully deployed position. The example lock-stay 22 includes first and second links 21, 23 pivotally secured to one another at a joint D, best shown in FIG. 1b. One end of the first link 21 is connected to the strut 14 at pivot B. A portion of the second link 23 is connected to the linkage 20 at pivot C. A biasing member 26 is arranged between the lock-stay 22 and the linkage 20 to bias the lock-stay 22 to the locked position shown in FIG. 1a. An unlock actuator 24 is interconnected between the linkage 20 and lock-stay 22 to pull the joint D from over-center, as depicted by the arrow in FIG. 1b (from the locked position shown in FIG. 1a), so that the extend/retract actuator 18 can move the landing gear 10 to a stowed position.

For the example unlock actuator 24, once the lock-stay 22 has been moved from over-center, the unlock actuator 24 free-drives. That is, the lock-stay 22 is no longer moved under the power of the unlock actuator 24, but rather, the extend/retract actuator 18 moves the lock-stay 22 and unlock actuator 24 as the landing gear 10 is stowed.

A controller 32 is used to control the operation of the landing gear and sense the location of various components. The controller 32 can be hardware and/or software and constructed as single or multiple units. For example, a lock position sensor 28 communicates with the controller 32 to detect the lock-stay 22 in a locked position, as shown schematically in FIG. 1a. The stowed position sensor 30 communicates with the controller 32 and detects the position of a portion of the landing gear 10 to ensure that the landing gear 10 is fully stowed.

Other sensors can be used to detect faults in the operation of the landing gear. For example, position sensors 54 are associated with the extend/retract actuator 18 to determine positions of components within the extend/retract actuator 18, as shown in FIG. 2. The position sensors 54 are in communication with the controller 32 and are used to evaluate whether a fault has occurred. Input and output devices 31, 33 are also in communication with the controller 32. The input device 31 includes one or more pilot initiated controls, for example. The output device 33 includes a fault indicator or a position indicator, for example.

Referring to FIG. 2, the extend/retract actuator 18 includes a body that houses two independent actuators that are mated back-to-back with leadscrews that are coaxially and telescopically arranged, for example. The locations of the components within the extend/retract actuator 18 are schematic and may be arranged in a different manner, if desired.

Referring to FIGS. 2-5, the extend/retract actuator 18 includes opposing ends 34 that are connected to the aircraft and landing gear strut 14. During "normal" operation in which there is no mechanical jam, an output rod 36 is extended and retracted axially to move the strut 14 while an emergency leadscrew 38 is maintained in an axially fixed position. More specifically, a main motor 44 rotationally drives a main leadscrew 40 through a main gearbox 46. The main motor 44 rotates a main driveshaft 70, which rotationally drives a main drive gear 58 through a layshaft 64, best shown in FIGS. 4 and 5. In the example, the main driveshaft 70 is parallel to the main leadscrew 40. The main drive gear 58 is affixed to an end of the main leadscrew 40 opposite the output rod 36, which includes a nut 56 that receives the main leadscrew 40.

The main motor 44 is selectively energized to rotationally drive the main leadscrew 40 and axially move the output rod 36 in and out relative to the body. A portion of the main leadscrew 40 is received by an inner cavity 42 of the output rod 36. The main motor 44 includes two separate and independently wound coils 66, 68, schematically shown in FIG. 4, that are connected to two separate power sources 43, 45, shown in FIG. 2. This provides redundancy in the main drive and enables the pilot to select a different power source when attempting to operate the landing gear 10 after a failed attempt.

Figure 3:
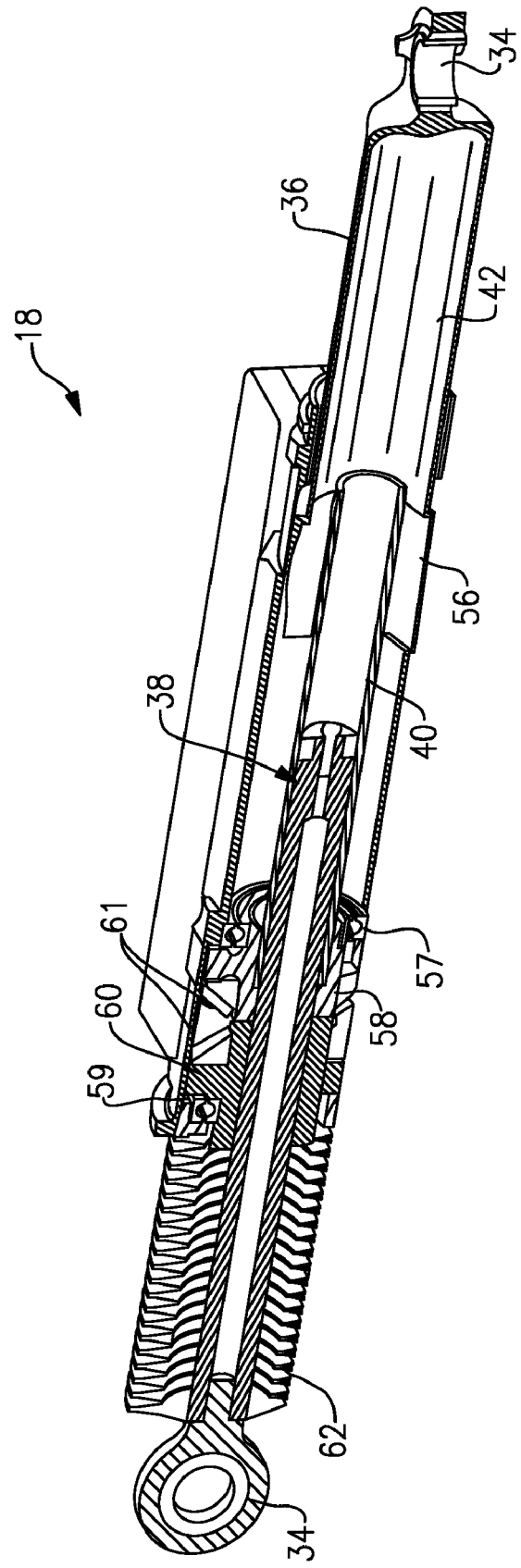
FIG. 3 is a cross-sectional view through main and emergency leadscrews of the extend/retract actuator.

Referring to FIG. 3, the main leadscrew 40 is supported by a bearing 57 arranged at main drive gear 58. A bearing 59 at an emergency drive gear 60 supports the emergency leadscrew 38. Roller bearings 61 are arranged between the main and emergency drive gears 58, 60 to support the leadscrews 38, 40 in the axial direction.

Figure 4:
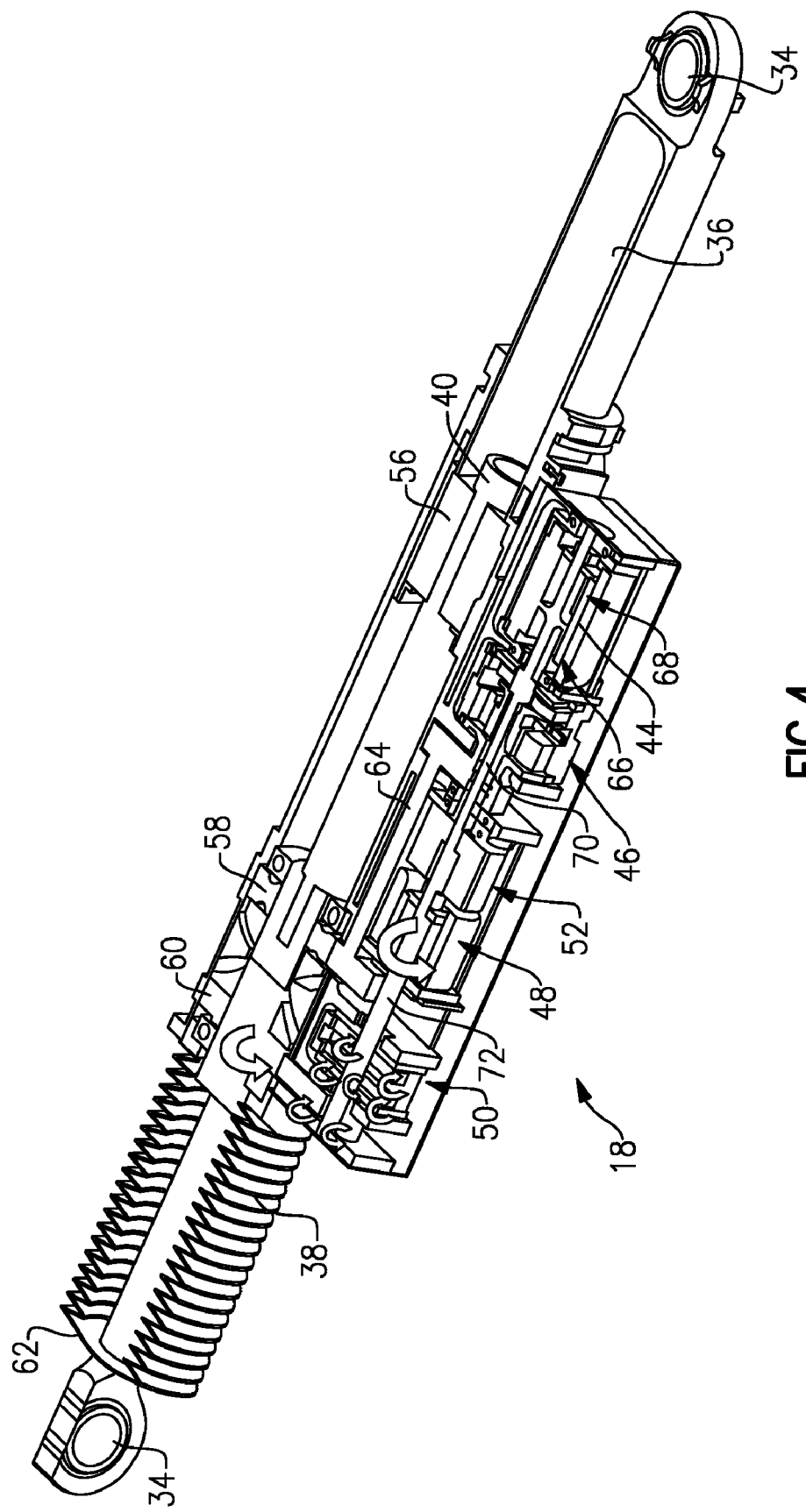
FIG. 4 is a cross-sectional view of the extend/retract actuator shown in FIG. 3 through main and emergency motors and gearboxes.
Figure 5:
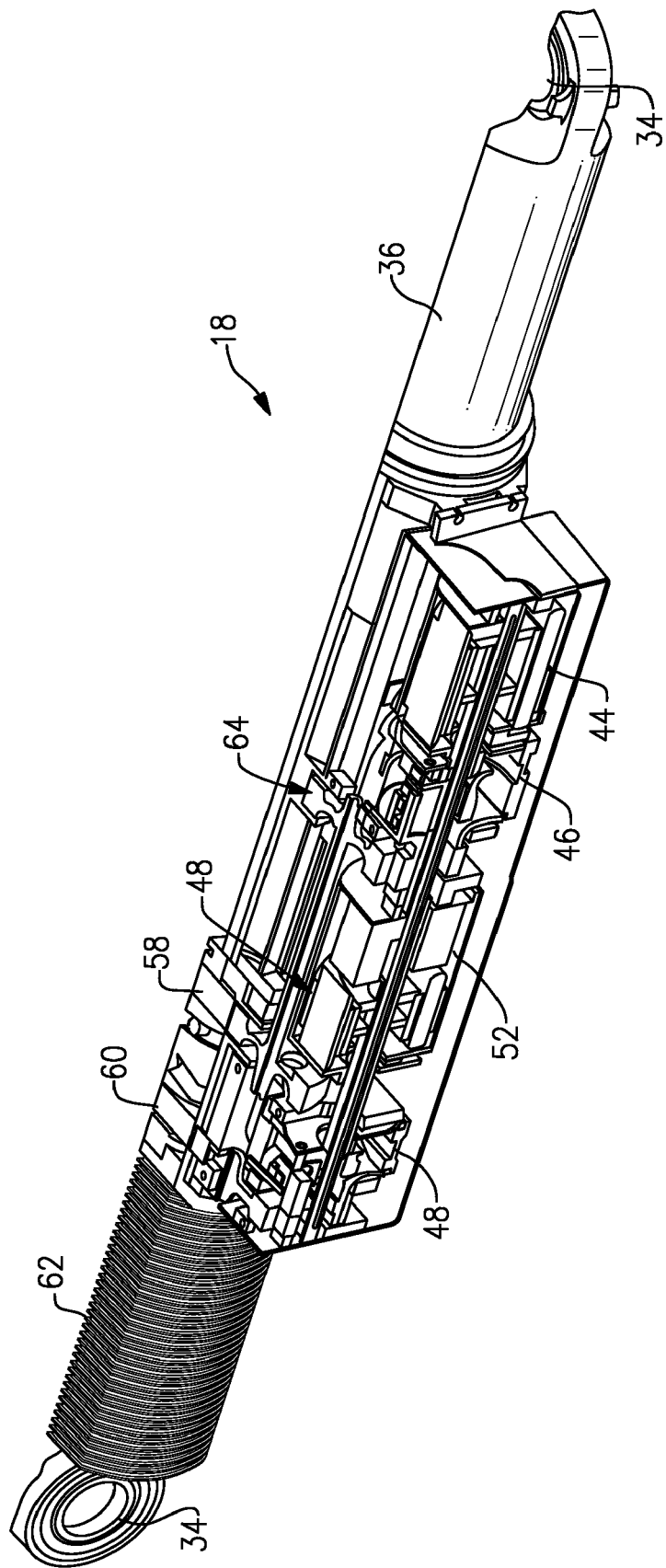
FIG. 5 is another cross-sectional view of the extend/retract actuator shown in FIG. 3 through the main and emergency motors and gearboxes as well as through a layshaft.

When there is a mechanical jam, failure or power loss to the main drive, an emergency motor 48 is used to drive the emergency leadscrew 38 axially in and out relative to the body, as shown in FIG. 4. Bellows 62 enclose the emergency leadscrew 38 where it extends from the body to the end 34. During failure of the main drive, the output rod 36 is maintained in an axially fixed position relative to the body. In one example, the emergency motor 48 is supplied power using a different power supply (schematically shown at 47 in FIG. 2) than at least one of the coils 66, 68 in the main motor 44 so that the emergency drive will continue to function in the event of a power loss to the main drive.

When in operation, the emergency motor 48 rotationally drives the emergency drive gear 60 using the emergency driveshaft 72 through the emergency gearbox 50 to axially move the emergency leadscrew 38 in and out relative to the body. In the example, the emergency driveshaft 72 is parallel to the emergency leadscrew 38. During "normal" operation in which the main drive is used to axially move the output rod 36, a brake 52 is used to lock the emergency leadscrew 38 and prevent its rotation. Thus, the brake 52 is in a normally engaged condition to prevent operation of the emergency drive. Upon a loss of power to the main motor 44, the brake 52 automatically releases or disengages which permits rotational drive of the emergency leadscrew 38 using the emergency motor 48.

Figure 6:
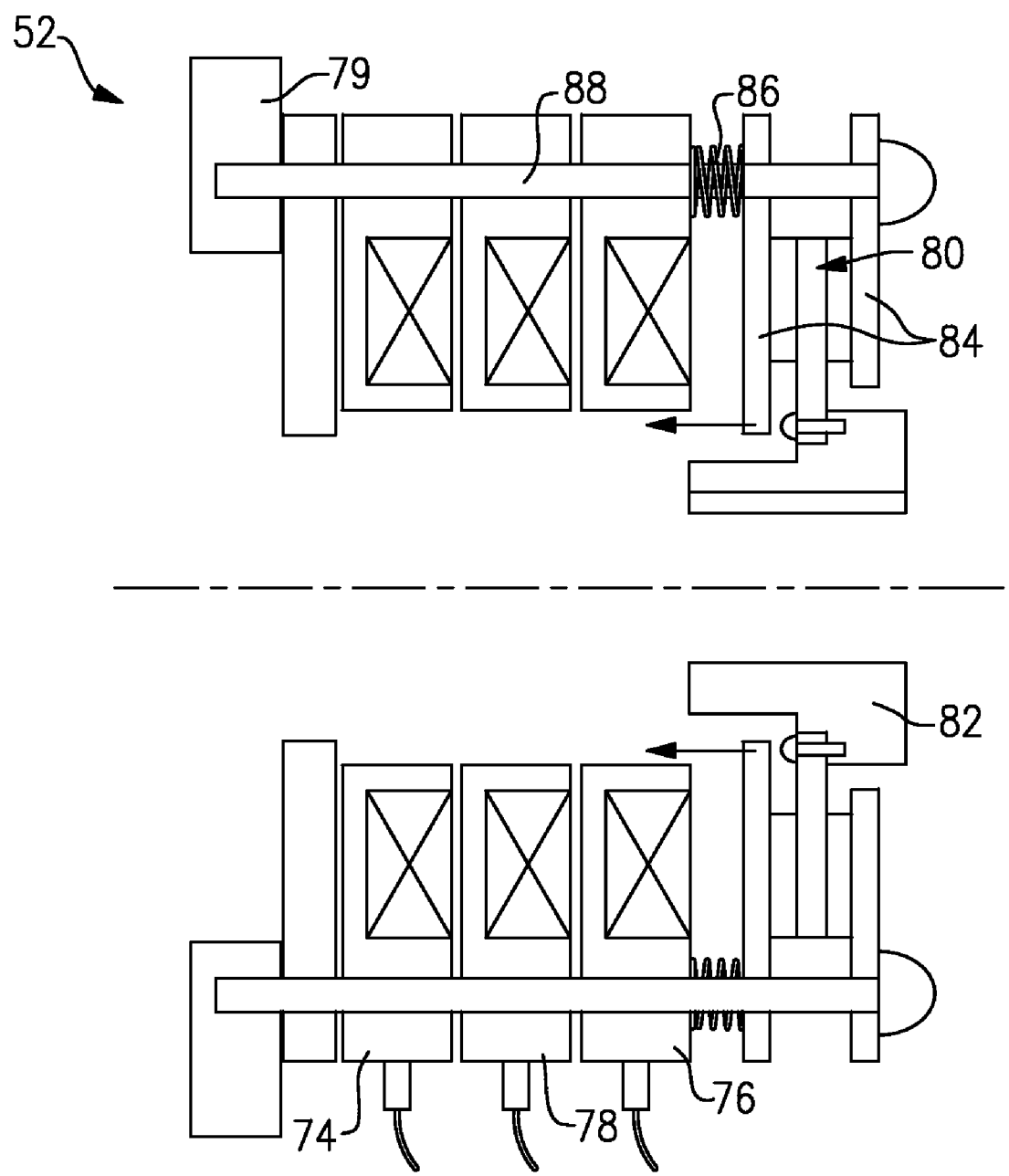
FIG. 6 is a highly schematic view of a brake for the extend/retract actuator.

The brake 52 is shown schematically in FIG. 6. The brake 52 is normally engaged by friction discs 80 that are secured relative to an actuator housing 79 and hub 82. The actuator housing 79 is associated with the extend/retract actuator 18 body, and the hub 82 is associated with the emergency driveshaft 72 (FIG. 4). A spring 86 biases a pressure plate 84 to force the friction discs 80 into engagement with one another, thus fixing the hub 82 relative to the actuator housing 79. One of three coils 74, 76, 78 can be used to disengage the brake 52 by retracting the pressure plate 84 along pin 88 thereby overcoming the spring 86. In one example, the coil 74 is operated by the main power source, and coils 76, 78 are independently operated by the emergency power source.

Figure 7A:
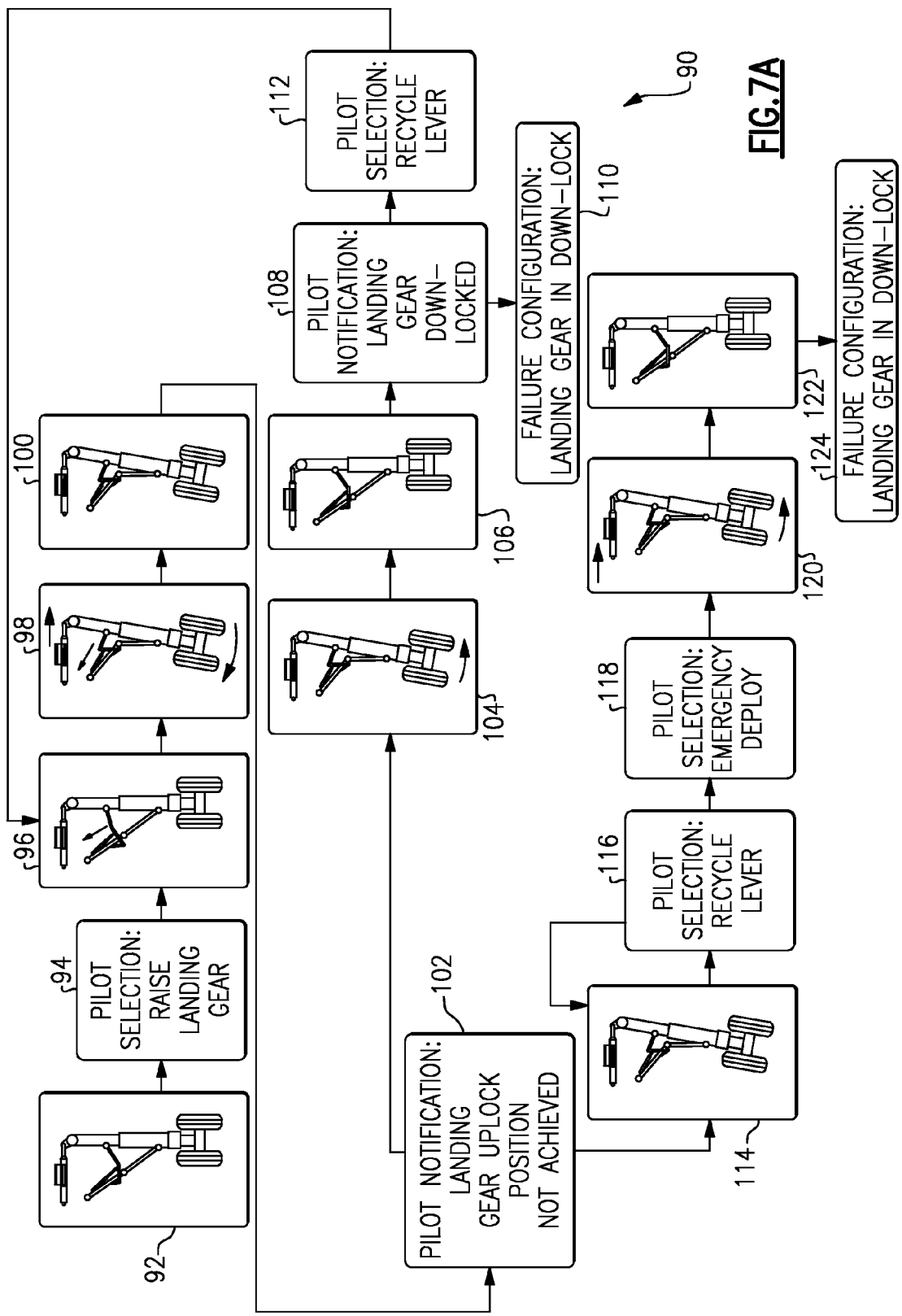
FIGS. 7A and 7B are schematic flow charts for stow and deploy cycles, respectively.
Figure 7B:
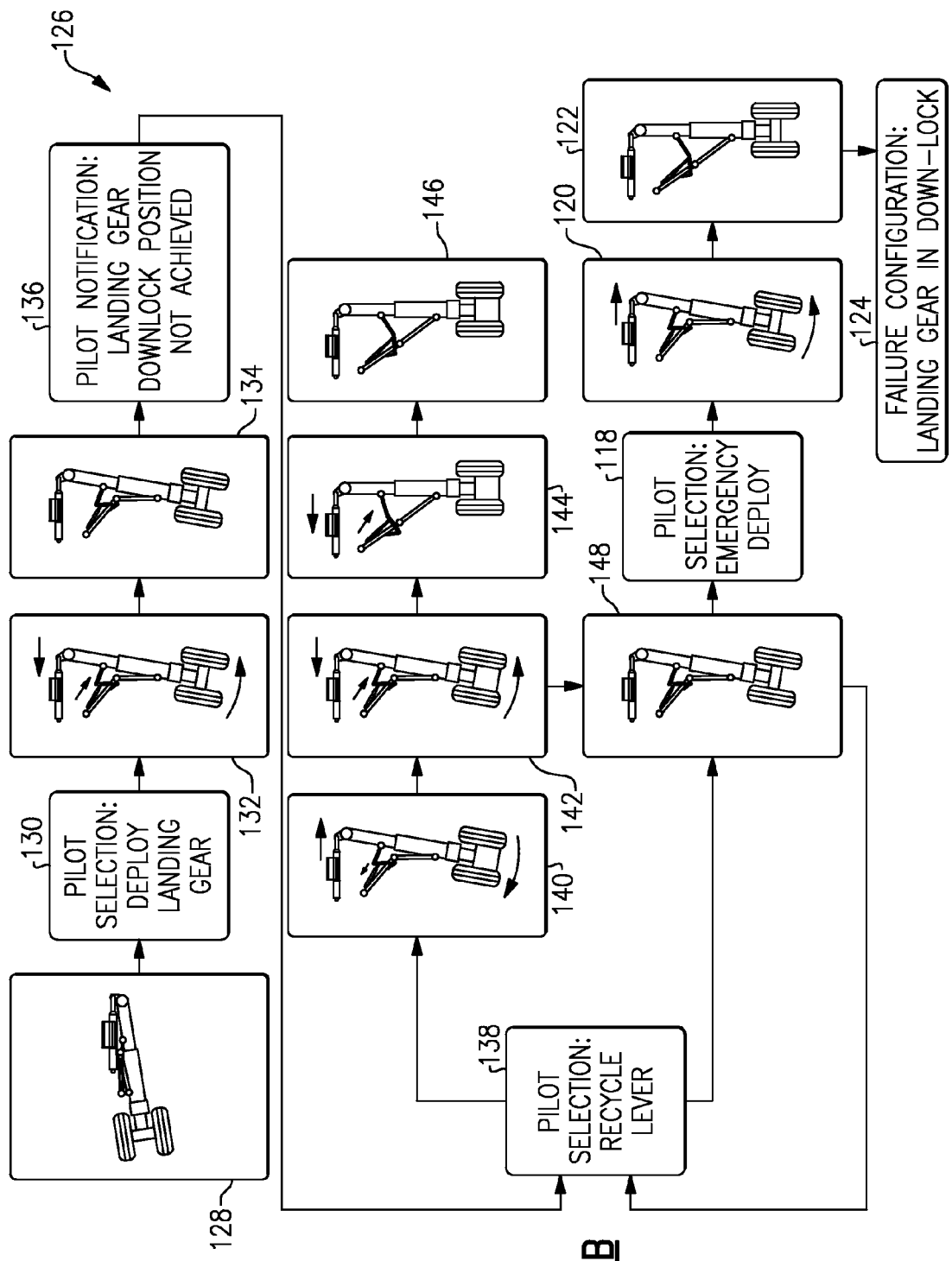

The operation of the landing gear 10 is schematically illustrated by the flow charts shown in FIGS. 7a and 7b. FIG. 7a illustrates a stow cycle 90 starting with the landing gear in the deployed position, as shown at block 92. The pilot sends a command to raise the landing gear, as indicated at block 94, thereby moving the lockstay from over-center (block 96). The output rod 36 begins extending to retract the landing gear (block 98), but becomes jammed (block 100) in the example. The sensors 28, 30, 54 cooperate to with the controller 32 to send a signal (block 102) to the pilot that the landing gear has not stowed, as desired. If the landing gear is only jammed in the retract direction, then the landing gear can be fully deployed and locked, as indicated at blocks 104, 106. The pilot is notified that the landing gear is fully deployed (block 108) and what has failed (block 110). The pilot can try to recycle the landing gear to the stowed position again to determine if the jam can be cleared (block 112).

A bi-direction jam is depicted at block 114. After a failed recycle attempt (block 116), the pilot can employ the emergency drive (block 118) to fully deploy the landing gear (blocks 120 and 122). The pilot is then alerted to the failure mode of the extend/retract actuator 18 (block 124). The operation of the emergency drive to fully deploy the landing gear will be discussed in greater detail below relative to the deploy cycle 126 schematically illustrated in FIG. 7b.

Figure 8:
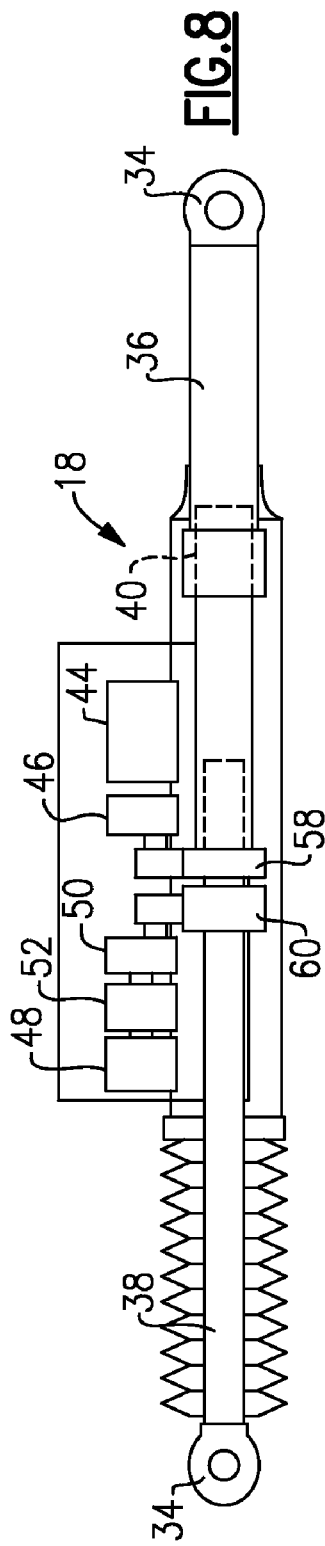
Figure 9:
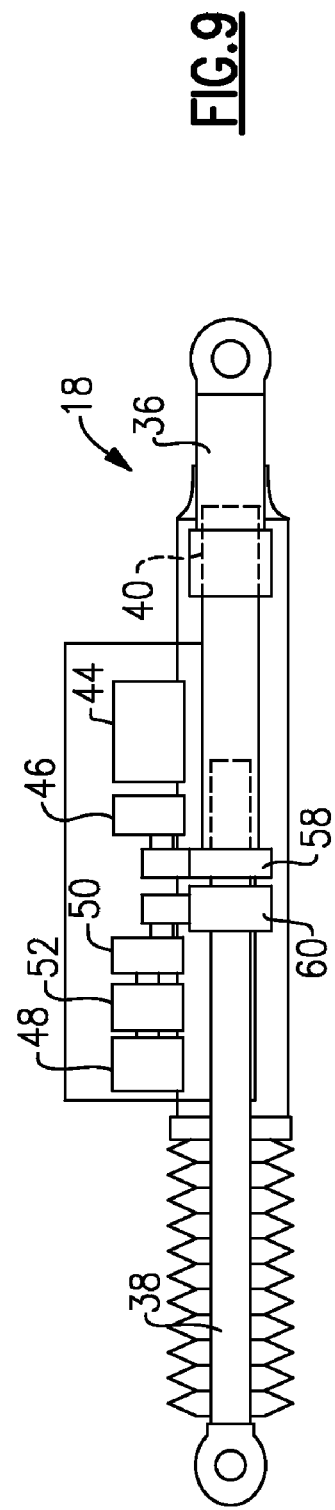
Figure 10:
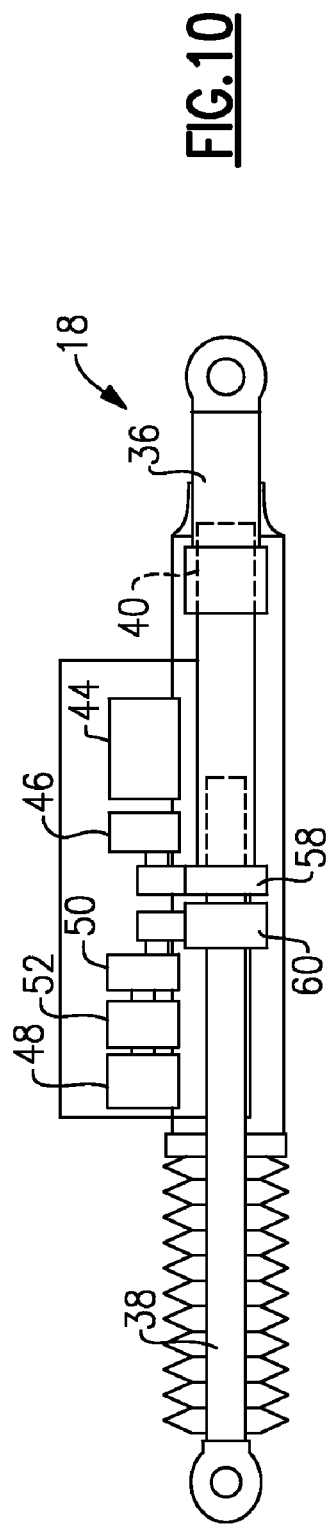

Referring to FIG. 7b, the landing gear is shown in a stowed position at block 128. The pilot commands the landing gear to deploy (block 130). Referring to FIG. 8, the extend/retract actuator 18 is shown in a stowed position. To retract the landing gear, the main motor 44 is energized (with brake 52 engaged) to rotational drive the main leadscrew 40, which axially moves the output rod 36 inward, as shown in FIG. 9. While the landing gear is deploying (block 132), the landing gear may become jammed (block 134). In one example, the main drive becomes jammed in the position shown in FIG. 10 during the deploy cycle, or the power to the main motor 44 is lost when in this position. The pilot is notified of the jam (block 136) and the can attempt to recycle the landing gear (block 138) to clear the jam. This can be achieved at times by partially retracting the landing gear (140) and then again deploying the landing gear (blocks 142, 144, 146).

If landing gear again jams during the reattempted deploy (block 148), the pilot can employ the emergency drive to fully deploy the landing gear (block 118). One of the coils 74, 76, 78 (FIG. 6) is energized to release the brake 52 thereby permitting rotation of the emergency drive gear 60. The emergency motor 48 is energized to rotationally drive the emergency drive gear 60 through the emergency gearbox 50, which axially moves the emergency leadscrew 38 outward relative to the body, as shown in FIGS. 11 and 12, until the landing gear has been fully deployed (block 122). In this manner, the landing gear 10 is permitted to cycle to a fully deployed position when there is a jam or power loss to the main drive.

Once the jam has been cleared in the main drive or the power has been restored to it, the main motor 44 is used to reset the position of the components within the extend/retract actuator 18, as shown in FIG. 13. With the brake 52 released using the coil 74, for example, the main motor 44 rotationally drives the main leadscrew 40 into the output rod 36. At the same time the main leadscrew 40 back-drives the emergency leadscrew 38 to return in to its "home" or "normal" axial position relative to the body.

Although an example embodiment has been disclosed, a worker of ordinary skill in this art would recognize that certain modifications would come within the scope of the claims. For that reason, the following claims should be studied to determine their true scope and content.

What is claimed is:

1. A landing gear system comprising:
    a landing gear strut rotatable between stowed and deployed positions;
    an actuator connected to the landing gear strut, and including main and emergency drives housed within a common body and operable independently from one another, wherein the main and emergency drives respectively include main and emergency electric motors;
    a controller in communication with the actuator and configured to command the actuator between the stowed and deployed positions in response to an input, the controller commanding the main drive during a normal operating condition and commanding the emergency drive in a failure condition of the main drive; and
    a lockstay that cooperates with the landing gear strut to lock the landing gear strut in the deployed position, and an unlock actuator coupled to the lockstay and configured to move the lockstay from a locked condition to an unlocked condition.

2. The landing gear system according to claim 1, comprising a brake that disables the emergency drive in the normal operating condition, the brake released by the controller in the failure condition to permit rotation of the emergency drive.

3. The landing gear system according to claim 1, wherein the main and emergency drives respectively include main and emergency leadscrews that are coaxial with one another, the main leadscrew threadingly engaging an output rod, the main drive configured to axially move the output rod with the main leadscrew, and the emergency drive configured to axially move the emergency leadscrew.

4. A landing gear actuator comprising:
    a body supporting emergency and main leadscrews arranged coaxially with one another;
    main and emergency motors respectively coupled to the main and emergency leadscrews;
    an output rod supported by and extending from the body, the output rod threadingly coupled to the main leadscrew and configured to move axially in response to rotation of the main leadscrew; and
    a brake that cooperates with the emergency leadscrew and configured to fix the emergency leadscrew relative to the body in a normal operating condition, the main leadscrew configured to axially move the output rod in the normal operating condition, wherein the brake includes at least two separate coils, the coils configured to be energized independently from one another, wherein the brake is configured to be released in a failure condition with one of the coils, the emergency motor configured to axially drive the emergency leadscrew relative to the body in the failure condition.

5. The landing gear actuator according to claim 4, wherein the output rod and main leadscrew are coaxial with one another.

6. The landing gear actuator according to claim 5, wherein the main and emergency leadscrews and the output rod are telescopically arranged relative to one another.

7. The landing gear actuator according to claim 4, wherein the main and emergency motors include driveshafts that are separate from and parallel to the main and emergency leadscrews.

8. A method of cycling a landing gear between stowed and deployed positions comprising the steps of:
    energizing a main motor to rotationally drive a main leadscrew;
    axially moving an output rod relative to a body with the main leadscrew, and engaging a brake to fix an emergency leadscrew relative to the body;
    experiencing a failure in the main drive, which includes the main motor and main leadscrew;
    releasing the brake prior to performing an emergency motor energizing step;
    performing the emergency motor energizing step, including rotationally driving an emergency leadscrew that is different than the main leadscrew and output rod;
    axially moving the emergency leadscrew relative to the body; and
    switching from a main power source to an emergency power source for at least one of the releasing and energizing steps.

9. The method according to claim 8, wherein the main motor energizing step includes a main motor having at least two independent coils, the main motor energized using only one of the at least two independent coils, wherein one coil is connected to the main power source and the other coil is connected to the emergency power source.

10. The method according to claim 8, wherein the output shaft and main leadscrew are arranged telescopically relative to one another, and the main leadscrew and emergency leadscrew are arranged telescopically relative to one another.

* * * * *